H. P. SMITH.
MACHINE FOR MAKING HAIR PINS.
APPLICATION FILED FEB. 5, 1918.

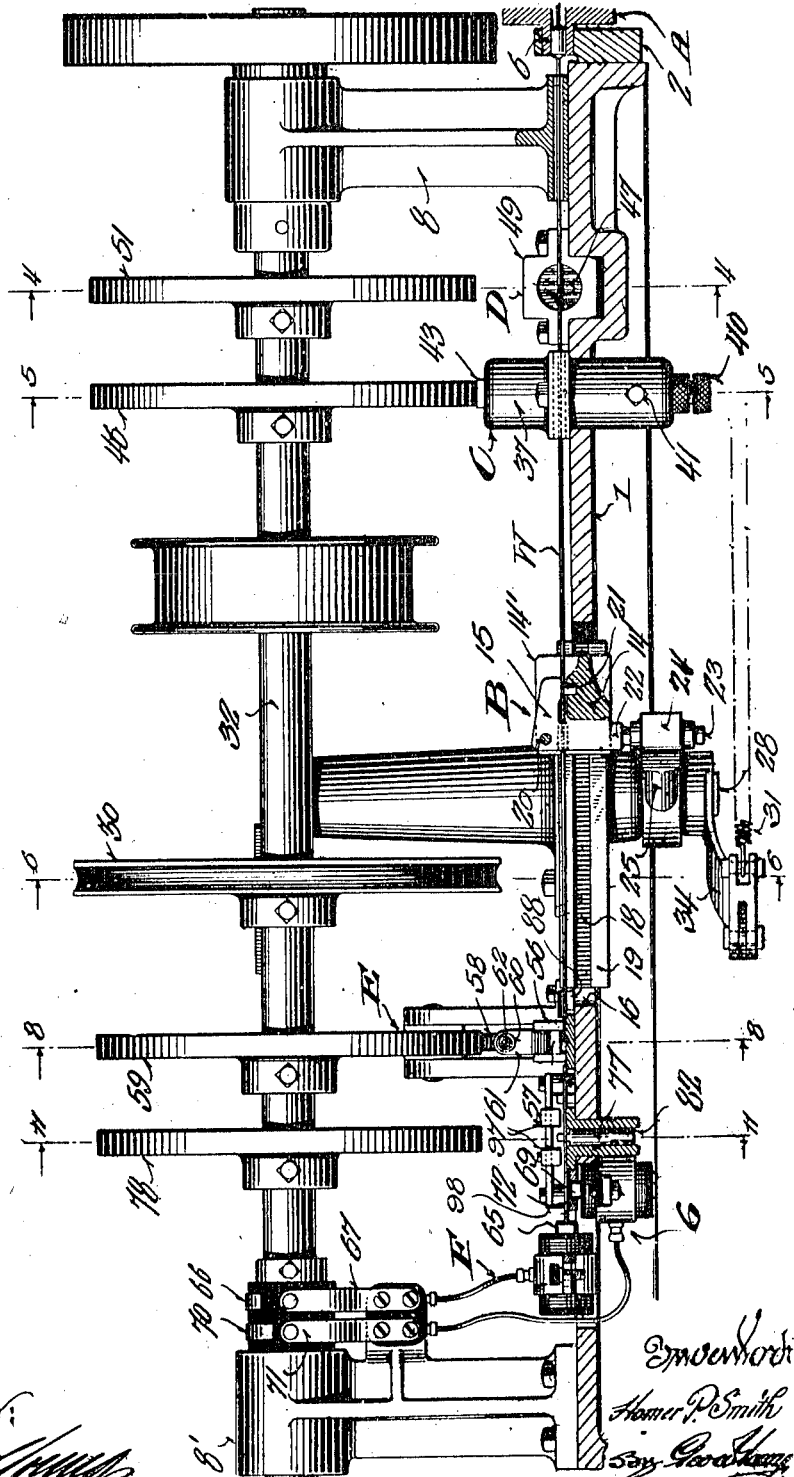

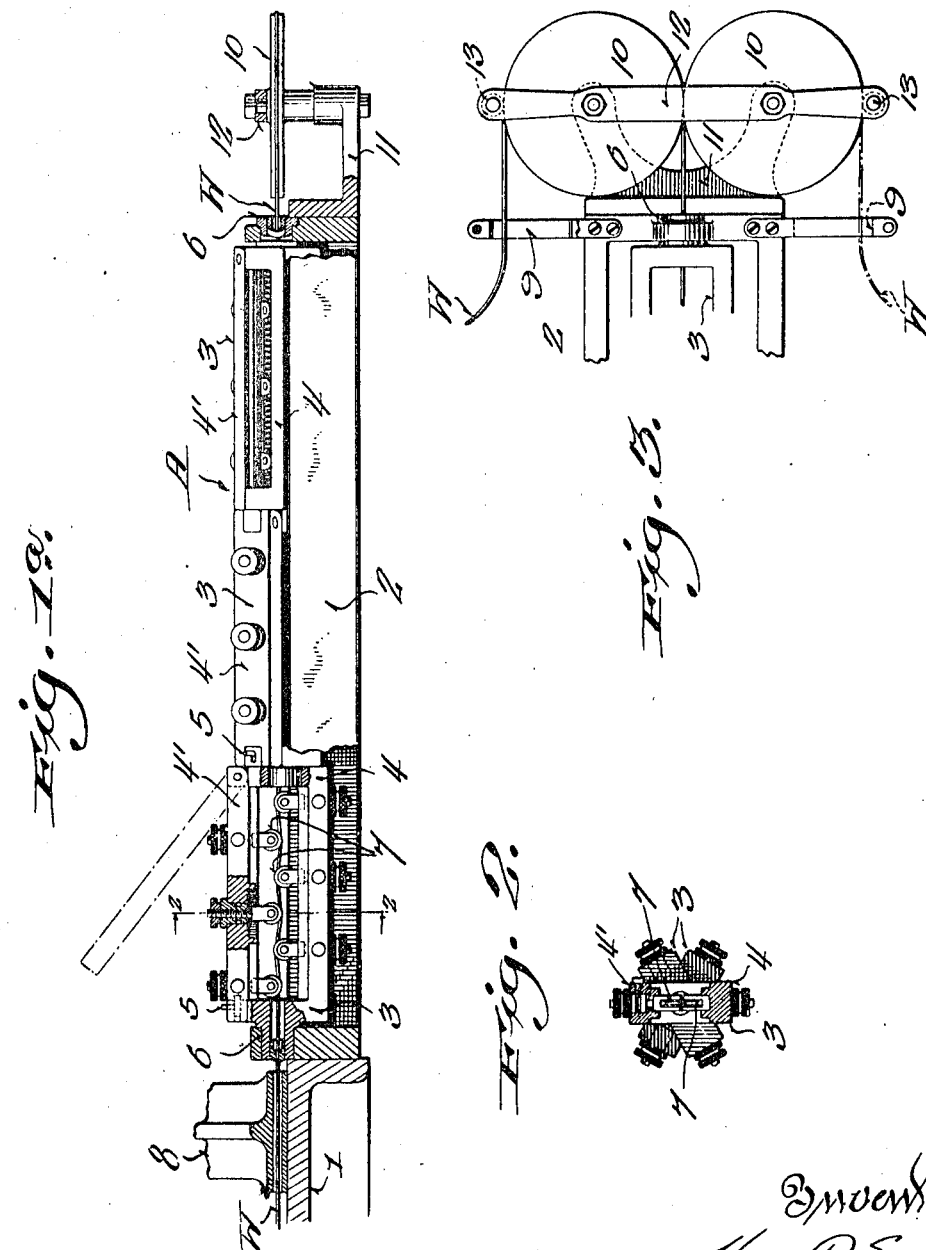

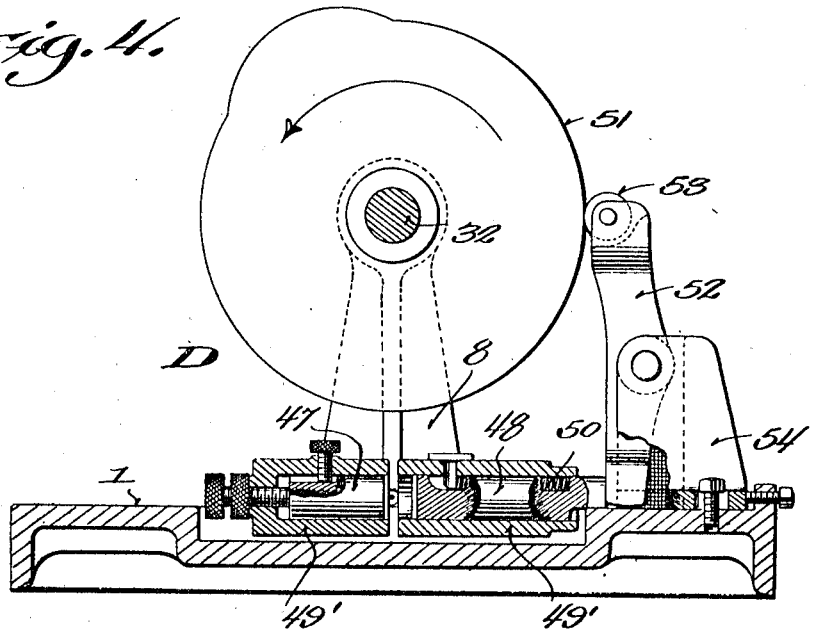
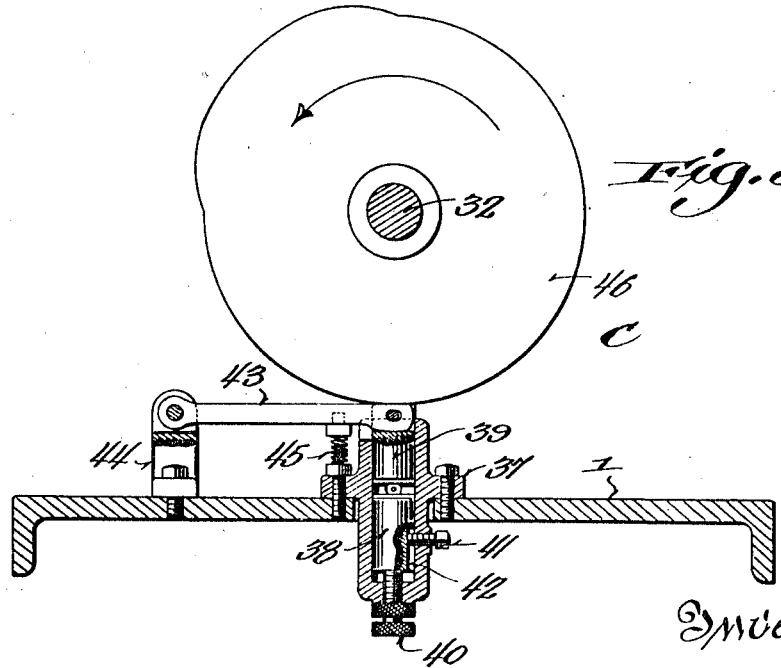

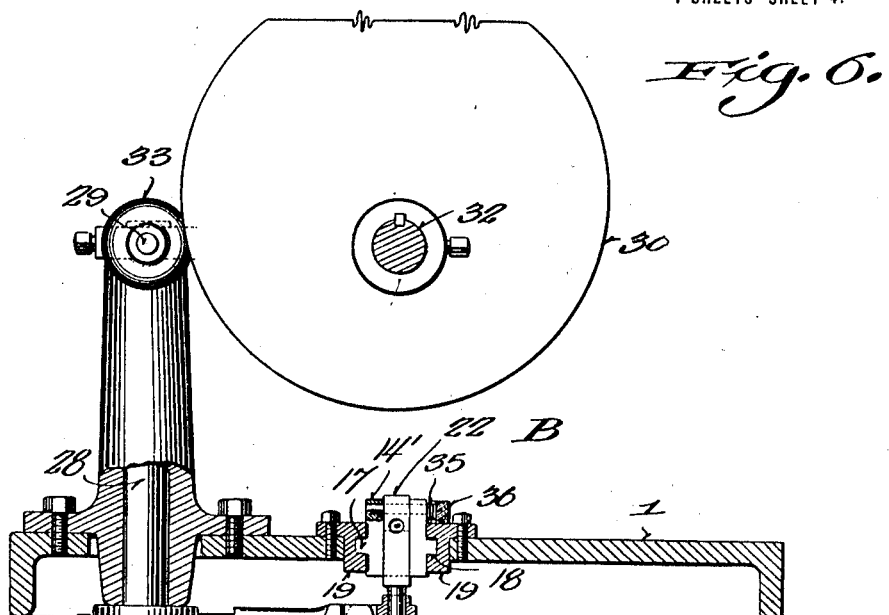
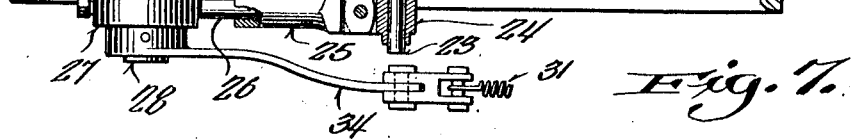
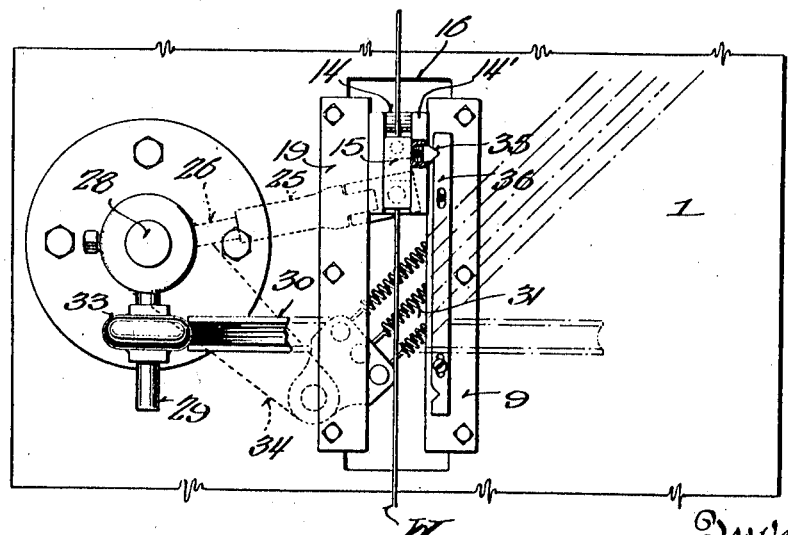

1,309,660.

Patented July 15, 1919.
7 SHEETS—SHEET 5.

Witness:

Inventor:
Homer P. Smith
By Geo. Young
Attorney

H. P. SMITH.
MACHINE FOR MAKING HAIR PINS.
APPLICATION FILED FEB. 5, 1918.
1,309,660.
Patented July 15, 1919.
7 SHEETS—SHEET 6.
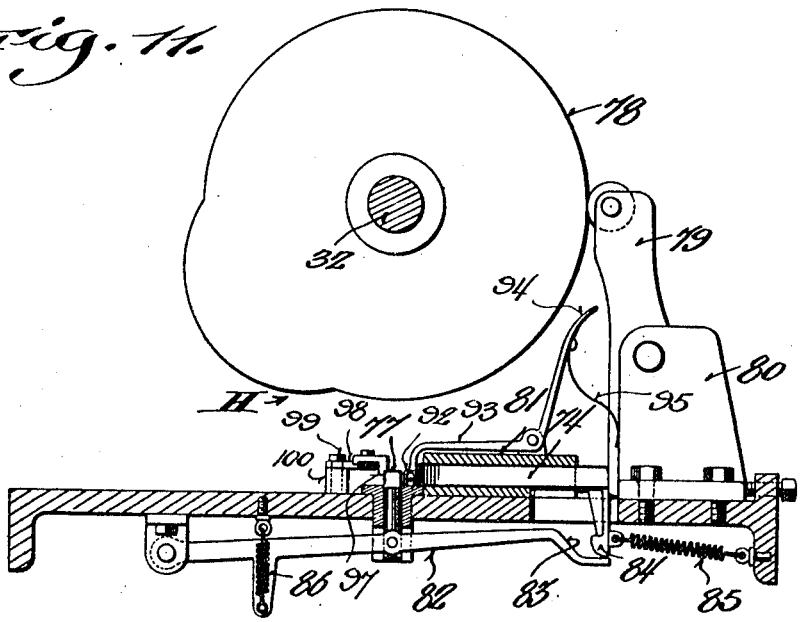
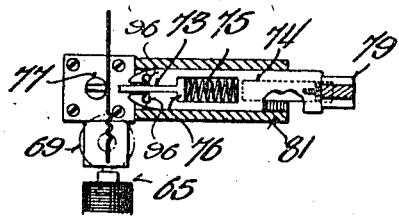
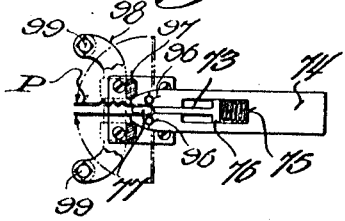
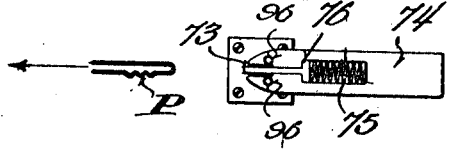
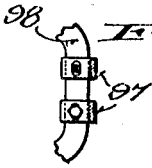

H. P. SMITH.
MACHINE FOR MAKING HAIR PINS.
APPLICATION FILED FEB. 5, 1918.
1,309,660.
Patented July 15, 1919.
7 SHEETS—SHEET 7.
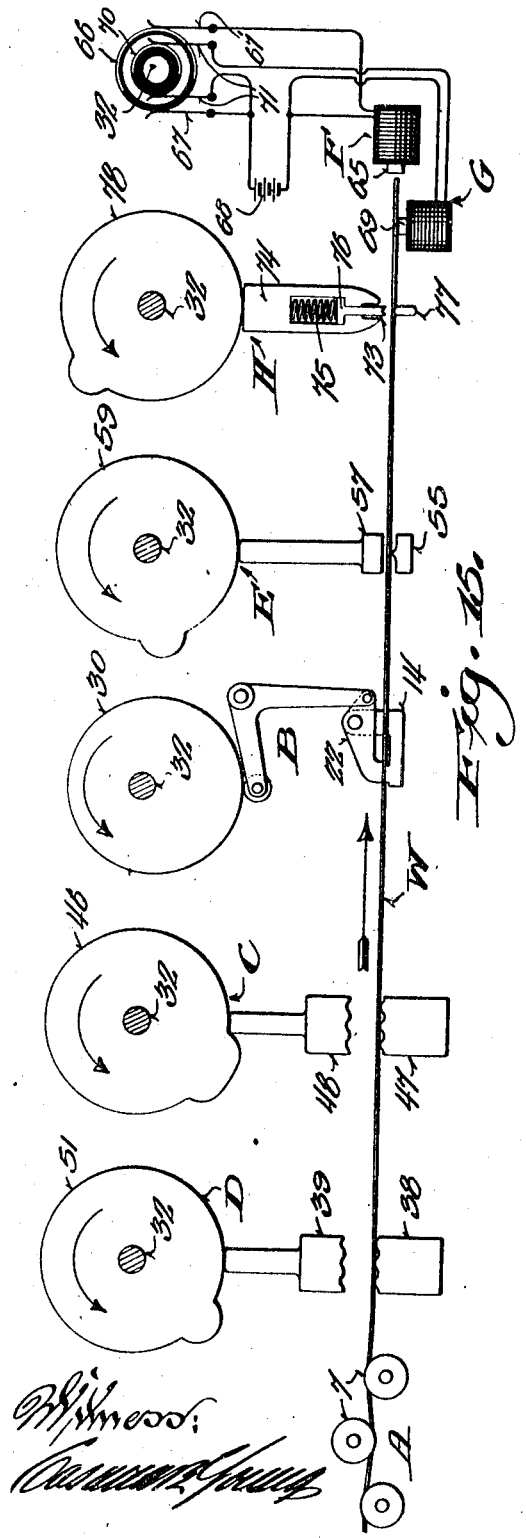
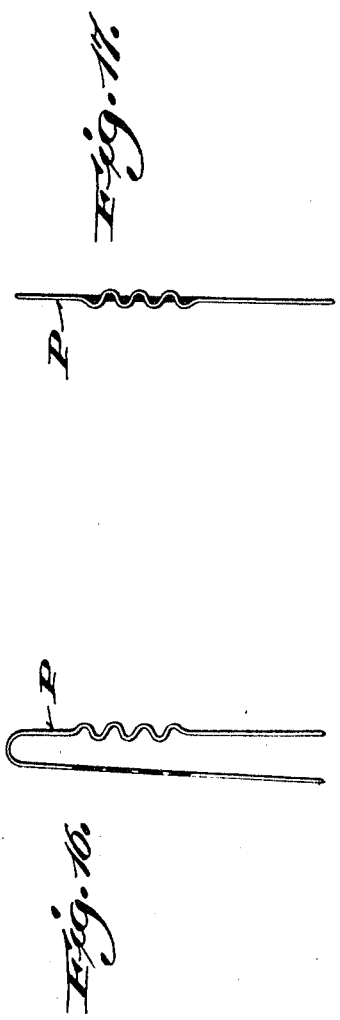

UNITED STATES PATENT OFFICE.

HOMER P. SMITH, OF APPLETON, WISCONSIN, ASSIGNOR OF ONE-THIRD TO F. EDWARD SAECKER AND ONE-THIRD TO HERMAN G. SAECKER, BOTH OF APPLETON, WISCONSIN.

MACHINE FOR MAKING HAIR-PINS.

1,309,660.

Specification of Letters Patent.  Patented July 15, 1919.

Application filed February 5, 1918.  Serial No. 215,500.

*To all whom it may concern:*

Be it known that I, HOMER P. SMITH, a citizen of the United States, and resident of Appleton, in the county of Outagamie and State of Wisconsin, have invented certain new and useful Improvements in Machines for Making Hair-Pins; and I do hereby declare that the following is a full, clear, and exact description thereof.

My invention relates to new and useful improvements in machines for making hairpins, the principal objects being to simplify the construction, increase the production, and decrease the operating cost of machines of this character.

Other objects which follow from and are subsidiary to the main objects of the invention are to provide improved wire straightening mechanism for preparing stock wire before the same is acted upon by the principal portions of the machine; to provide improved mechanism for feeding the stock wire from the straightener to the crimping mechanism; to provide an improved arrangement for successively crimping the wire, said arrangement being adapted to act in synchrony with said feeding mechanism; to provide a novel cutting mechanism for severing the crimped wire into predetermined lengths in such a manner as to leave the ends of the wire free from any irregularities or roughness which might tend to catch in the user's hair; to provide an improved and efficient electro-magnetic means for feeding the severed portion of the stock wire from the cutting mechanism to the bending mechanism and holding the same in proper position to be acted upon by said bending mechanism; and finally to provide an efficient bending mechanism which, after completing the formation of the hairpin, will eject the same into a suitable receptacle provided for the purpose.

The invention resides in certain novel features of construction, combination and arrangement of parts which will be hereinafter more particularly described and claimed and shown in the accompanying drawings in which:

Figure 1 represents a central vertical longitudinal sectional view through one end of a machine constructed in accordance with my invention.

Fig. 1ª is a similar view of the other end of the machine.

Fig. 2 is a vertical transverse sectional view taken substantially on the plane of the line 2—2 of Fig. 1ª.

Fig. 3 is a plan view of one end portion of the machine showing particularly the stock wire supply mechanism.

Figs. 4, 5 and 6 are vertical transverse sectional views taken respectively on the planes of the lines 4—4, 5—5 and 6—6 of Fig. 1.

Fig. 7 is a plan view of the feeding mechanism shown in section and in side elevation in Fig. 6.

Figure 8:
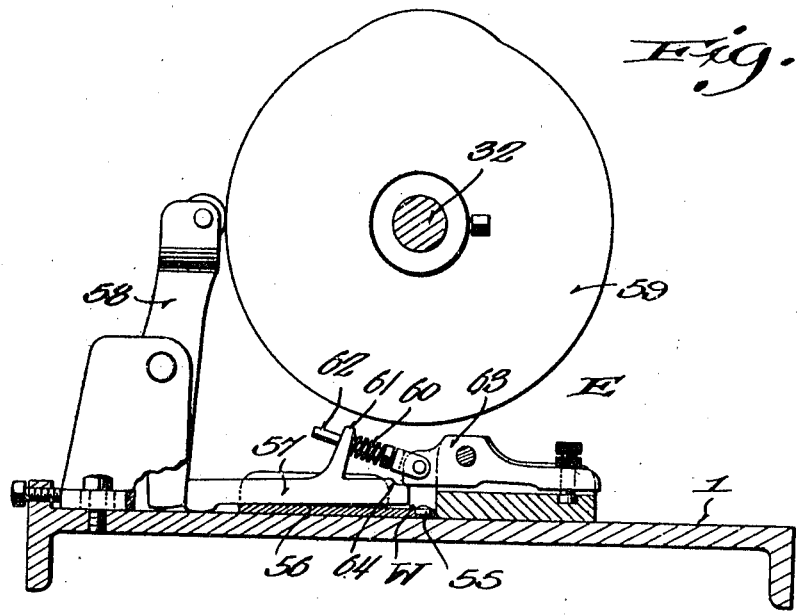

Fig. 8 is a vertical transverse sectional view taken on the plane of the line 8—8 of Fig. 1 and illustrating the cutting mechanism.

Figure 9:
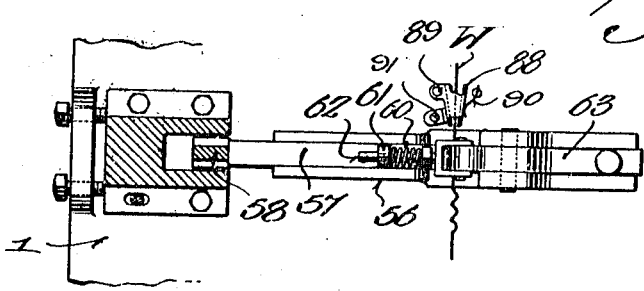

Fig. 9 is a plan view partly in section of said cutting mechanism illustrated in Fig. 8.

Figure 10:
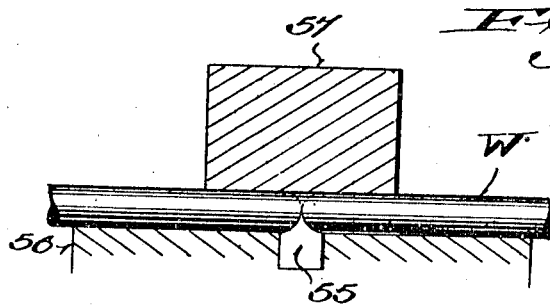

Fig. 10 is an enlarged detail sectional view through the cutting blade and the adjacent parts of said cutting mechanism.

Fig. 11 is a vertical transverse sectional view taken on the plane of the line 11—11 of Fig. 1 and illustrating the bending mechanism.

Figs. 12, 13, 13ª and 14 are detail plan views of the principal operating parts of said bending mechanism illustrating the several steps necessary in forming the crimped straight section of wire into a completed hairpin.

Fig. 15 is a diagrammatic view for illustrating particularly the several steps and operations which take place between the time of straightening the stock wire and the ejection of the complete hairpin from the machine.

Figs. 16 and 17 illustrate two elevational views of a complete hairpin constructed in accordance with my invention.

Briefly the operations which my improved machine performs are the straightening of stock wire, feeding the same to crimping mechanism, crimping the wire at two spaced points, severing the crimped portion of the wire, feeding the severed and crimped portion of the wire to the bending mechanism, holding the same in position to be properly operated upon by said bending mechanism and then bending the severed portion of the wire upon itself intermediate the crimps therein to provide a complete hairpin. In the following description the straightener and operation of each of these other mechanisms will be explained separately and in detail, and then their relation to each other set forth.

Therefore beginning with the wire straightening mechanism and the correlated parts it will be seen that these elements are supported upon or by a platform or table 1 which may be disposed upon suitable legs or the like, said wire straightening mechanism A preferably being disposed at one end of the table. The straightener proper is mounted directly in a main supporting frame 2 of preferably rectangular formation and consists of a plurality of connected rectangular frames 3, each of which includes a pair of longitudinally disposed spaced parallel bars 4 and 4'. From Fig. 1ª it will be noted that the bars 4 are formed integrally with the end portions of the frames 3, while the bars 4' are pivoted at one end thereto, their free ends being provided with suitable catches 5 for holding the same in parallelism with the relatively stationary bars 4.

Each of the ends of the frames 3 is provided with an opening through which the stock wire W passes, and in addition the outer ends of the end frames 3 are provided with laterally extending trunnions 6 journaled in bearings carried by the opposite ends of the frame 2. Said trunnions are also hollow to permit said wire W to pass therethrough. The present application has no means illustrated for revolving the frames 3 within the frame 2, but if necessary an arrangement for accomplishing this purpose may easily be added.

Each of the bars 4 and 4' carries a plurality of inwardly extending wire engaging members in the form of rollers 7, said rollers being adjustably connected with said bars 4 and 4' so that they might be moved toward or away from each other as will be obvious from Fig. 1ª. In threading the wire W from the wire supplying mechanism, to be hereinafter described, to the straightening mechanism and between the wire engaging members 7, said pivoted bars 4' are unlatched and swung to the dotted line position illustrated in the last mentioned figure. After the wire has been engaged with each of the engaging members 7 of the stationary bars 4 and threaded through the inner end of the frame 2 as well as the passage-way in the bottom of the standard 8, the hinged bars 4' may be returned to their normal position and latched.

One reason why it is not considered necessary to rotate the frames 3 is that each of the same is disposed at a different angle to the others as shown in Fig. 2. By such an arrangement the wire engaging members 7 are positioned to contact with a plurality of points on the periphery of the wire W. Thus by providing a number of the frames 3 the same purpose is attained as the provision of a single frame and rotating mechanism therefor.

The wire W is supplied to the straightening mechanism A from a reel mounted upon or beneath the table 1 or hung in any convenient position adjacent the machine, said wire passes from the reel through either of the guide arms 9 around either of the guide wheels 10 and between the same. These guide wheels 10 are journally mounted on a bracket 11 carried by the frame 2 and are disposed so that their peripheries engage, said peripheries being grooved to receive said wire. The bracket 11 also carries a bar 12 which is disposed diametrically across the two wheels 10 and carries at its opposite ends rollers 13, said rollers being preferably engaged with the peripheries of the guide wheels to retain said wire in engagement therewith at points diametrically opposite the engagement between said guide wheels. By being able to feed the wire W around either of the guide wheels much time may be saved as two or more reels of stock wire may be provided so that when one becomes exhausted the end of the wire of the other may be immediately threaded into the machine.

From the wire straightening mechanism A the wire W is intermittently pulled through the passage-way in the standards 8 and into engagement with the crimping mechanism to be hereinafter described by improved feeding mechanism B which is shown in detail in Figs. 1, 6 and 7. This feeding mechanism is supported upon the table 1 and the wire gripping elements thereof, which compromise a carriage 14 and a bell crank lever 15, are slidably disposed in a slot 16 in said table. The carriage 14 includes a channeled block having outwardly and oppositely extending tongues 17 which slide in grooves 18 formed in guides 19 secured to the opposite longitudinal sides of the slot 16. The bell crank lever 15 is pivoted as at 20 between the flanges 14' of the carriage 14, one arm of this bell crank lever being adapted to move toward and away from the bottom of the channel in the block of the carriage whereby to grip the wire W between the same and the bottom of said channel. The gripping end of the arm is preferably serrated or roughened and the bottom of the channel of the carriage is provided with a hardened contact member 21 also having a roughened face whereby to obviate slippage of the wire.

The other arm 22 of the bell crank lever 15 is extended downwardly and elongated, the free end portion being in the form of a cylindrical stem 23. This stem is designed to be slidably and rotatably disposed in the bore of a head 24 which is pivoted upon the outer end of a sleeve 25. This sleeve in turn is slidable and rotatable on a cylindrical crank 26 which projects from a collar 27 adjustably fixed to the lower end of a rock shaft 28. The slidable and rotatable connections between the stem 23 and the crank 26 forms in effect a universal joint.

It is obvious that owing to the connections between the rock shaft 28 and the carriage 14, rotation or oscillation of said rock shaft will reciprocate the latter in its guides 19. This is preferably carried out by means of an upper crank 29 adjustably fixed to the upper end of the rock shaft 28, an eccentric 30 and a plurality of springs 31. The eccentric 30 is longitudinally adjustably keyed or splined upon a main drive shaft 32 mounted above and parallel to the table 1 in bearings carried by standards 8 and 8', and peripherally grooved for engagement with a convex periphery of an anti-friction pulley wheel 33 which is rotatable and longitudinally slidable on said crank 29.

The springs 31 retain the pulley wheel 33 in engagement with the periphery of the eccentric at all times, and therefore cause the carriage 14 to move in one direction, while the said springs slide it in the reverse direction. These springs 31 (a plurality being provided in case one or more should break during the operation of the machine) have one end secured to the table 1 or any other stationary object, and the other ends connected to the free end of an arm 34 which projects from and is fixed to the lower end of the rock shaft 28.

It will be noted, particularly from Figs. 1 and 7, that by moving the eccentric 30 longitudinally of the shaft 32, and therefore moving the former toward or away from the free end of the upper crank 29, that a variation in the distance which the carriage 14 travels may be procured and thus vary the amount of wire W which is pulled from the wire straightening mechanism upon use of each actuation of said carriage. Hairpins of different lengths may be thus procured by slight changes in the machine.

The gripping of the wire by the bell crank 15 and the release thereof take place automatically upon movement of the carriage 14 in different directions. For instance when the carriage is moving toward the right end of the machine as viewed in Fig. 1 the gripping end of the horizontal arm of the bell crank 15 and the contact member 21 will be inactive and the wire will slide between the same. On the other hand when the carriage is moved toward the left end of the machine the wire is gripped and pulled in the same direction. This result is accomplished merely by the provision of the bell crank 15; this member being pivoted at 20 any force which is applied to the end of the arm 22 will cause the same to rock and therefore actuate the other or gripping arm. Inasmuch therefore as the direction of force as applied by the crank 26 is from one direction when the carriage is moved toward the right and from the other direction when it is traveling toward the left, the necessary movement of the gripping arm automatically takes place.

The carriage 14 has a spring pressed detent 35 mounted in one of its flanges 14', this detent being movable outwardly to spring into a notch formed in a longitudinally adjustable locking bar 36 which is secured to one of the guides 19. This notch in the locking bar is located adjacent one end thereof and is adapted to be engaged by the detent when said carriage reaches the end of its path of movement toward the right hand end of the machine. The carriage will thus always stop in one position at this end of its path of movement.

After the feeding mechanism, including the carriage 14 and the bell crank lever 15, has moved the wire W toward the left of the machine and while the same is still held thereby, the crimping mechanisms C and D are successively brought into operation. These two mechanism C and D form two series of spaced crimps in each portion of the wire which is ultimately to form a hairpin. The mechanism C is a vertical crimper, while the other is a horizontal crimper, these mechanisms being shown particularly in Figs. 1, 4, and 5.

The vertical crimper C (Fig. 5) includes a vertically positioned cylindrical housing 37 mounted on the table 1 in which is disposed a stationary crimping block 38 and a vertically reciprocating crimping block 39, and means for intermittently moving the last mentioned block toward the stationary block. The co-acting faces of the crimping blocks 38 and 39 are provided with intermeshing teeth, whereby when crimping upon the wire the same will be corrugated or zigzagged, said corrugations being disposed in a vertical plane.

The block 38 may be adjusted vertically within the housing 37 by means of a set screw 40 projecting through the bottom of the latter as clearly shown in Fig. 5. A second screw 41 disposable in a slot 42 in the block 38 prevents the latter from rotating within the housing.

The movable block 39 is pivoted to one end of a lever 43, the other end of which is fulcrumed between the ears of a bracket 44 secured to said table 1. An expansile spring 45 engages with the under side of the lever 43 and tends to force the block 39 upwardly and away from the stationary block 38. Said block 39 is intermittently moved toward the stationary block by the cam face of a cam plate or disk 46 which is secured to and rotates with the main drive shaft 32.

The horizontal crimping mechanism D, shown in Fig. 4, zig-zags or corrugates the wire W at a point spaced from the place acted upon by the vertical crimper, and the plane of the second series of corrugations or zig-zags is at right angles to that of the first. This second crimping mechanism is somewhat similar to that first described, including a stationary crimping block 47 and a reciprocatorily movable crimping block 48, each of which is mounted in a separate housing 49 and 49' respectively, although they obviously might also be positioned in a single housing as in the case of the blocks 38 and 39. The stationary block 47 is adjusted in the same manner as the similar block 38 of the mechanism C. An expansile spring 50 disposed within a recess in the block 48 causes the same to normally move outwardly and away from the stationary block 47.

Said reciprocatorily movable block 48 is forced toward the stationary block intermittently by the engagement of the cam face of a cam plate or disk 5 with the upper end of a vertically disposed intermediately pivoted lever 52 or with an anti-friction roller 53 carried by the end thereof. This lever 52 is pivoted between the ears of a bracket 54 that is secured to the table 1 in position to have its lower end engageable with the outer end of said movable crimping block 48. Thus upon engagement of the cam face of the plate 51 with the roller 53, the block 48 will be moved inwardly to perform its function of crimping.

From Fig. 1 the relative positions of the wire straightening mechanism, the feeding mechanism, and the two crimping mechanisms can be readily seen and also the advantage of such an arrangement. As hereinbefore mentioned the feeding mechanism hold the end of the wire W while the vertical crimper C and the horizontal crimper D act thereon. Furthermore as shown by the diagrammatic view in Fig. 15 the cam faces of the disks 46 and 51 are so arranged that said vertical and horizontal crimpers will successively act upon the wire.

Upon each crimping of the wire the same is slightly shortened, but inasmuch as one end is held by the carriage 14 and bell crank 15, any contracting movement must occur on the opposite side of the crimping mechanism from the feeding mechanism. In other words as the vertical crimping is formed in the wire an additional amount of such wire is pulled from the straightening mechanism, and the same occurs when the horizontal crimp is formed which takes place immediately after the formation of the vertical crimps and while the blocks 38 and 39 are still engaged with the wire.

The next step in the formation of the hairpin is the operation of the cutting mechanism E during which the crimped portion of the wire is severed from the following part. Some difficulty has been experienced in retaining the ends of the cut off parts of the wire smooth or without irregular places which might catch in the user's hair. I accomplish this by the provision of a blade 55 having a substantially V-shaped cutting edge, the opposite faces of which are concave. Thus if a wire is rolled over a stationary blade of this type and at the same time forced tightly against the same, or if a movable blade of such shape is forced against the rolling wire, it will be severed and the resulting ends will be substantially hemi-spherical or rounded as shown in Fig. 10. The other figures illustrating the cutting mechanism E are Figs. 1, 8 and 9.

The blade 55 may be either secured in the bottom of a transversely disposed channeled member 56 positioned on the table 1 and the wire rolled thereover by means of a sliding bar 57, or else the blade carried by the bar itself. This bar 57 is movable transversely of the wire by the engagement of one end of an intermediately pivoted lever 58 therewith, said lever in turn being actuated by a cam face formed on a cam plate or disk 59. This cam plate, like the plates 46 and 51, is rotatable with the main drive shaft 32 to which it is connected.

The end of the bar 57 which engages the wire is normally spaced above the bottom of the channeled member 56 by means of a spring 60, one end of which engages an ear 61 formed on said bar and the other end contacts with the bifurcated end of a stem 62 pivoted to a relatively stationary guide member 63. The end of the bar 57 which engages said wire W is provided with a cam face 64 which, when said bar is moved toward the wire and the blade 55, engages with the end of the guide member 63, whereby said end of the bar is moved toward the bottom of the channeled member 56. Thus longitudinal shifting of the bar 57 toward the wire W by means of the lever 58 will cause the wire to be rolled toward and over the blade 55 and simultaneously with this movement said wire will be forcibly engaged and pressed against the latter and cut. The guide member 63 is provided with means for adjusting the same for use with wires of different diameters.

The wire is directed into the cutting mechanism by an inverted channel shaped guide 88, one flange of which has a laterally extending ear 89 whereby it may be pivoted to the table 1. The opposite flange of the guide is engaged by a leaf spring 90 by which it is forced against a stop 91. The wire W extends from the feeding mechanism B to the cutting mechanism E through this guide 88 so that the portion to be severed will always be in correct position to permit effective operation of the mechanism E. During the working of the last mentioned mechanism the wire W is rolled and its free end portion shifted laterally, the guide being moved on its pivot to compensate therefor, said guide being returned to its normal position by the spring 90 during the inoperativeness of the cutting mechanism.

After the crimped portion of the endless stock wire W has been severed it is further moved across the table 1 by a supplemental feeding mechanism F in the form of a permanent or electromagnet 65. The crimped portion of the wire is not severed until one end thereof is quite close to the magnet 65 so that it is not necessary that the latter be of unusual strength. The principal purpose of this magnet is to draw one end of the severed portion of the wire into engagement therewith whereby the bending mechanism H, to be hereinafter more particularly described, will be in proper relation thereto.

Although the magnet 65 may be of permanent type, it is preferably electro-magnetic so that it will be only intermittently energized. The proper timing mechanism for energizing the magnet 65 is shown in Figs. 1 and 15, the same including a rotary contact element 66 secured upon and movable with the shaft 32, a pair of stationary spring contact fingers 67 and 67', a battery 68 and suitable wiring. The rotary contact element 66 is so constructed that the circuit between the battery and the magnet will be made and broken in synchrony with the other operations herein before and to be hereinafter described.

Coöperating with the supplemental feeding mechanism F is an electro-magnetic positioning mechanism G which includes an electro-magnet 69 intermittently energized by the battery 68 through a rotary switch formed of a rotary contact member 70 and the stationary contact fingers 71. The contact element 70 is also secured to and rotatable with a shaft 32.

It might be here explained that each of the completed hairpins P, as shown in Figs. 16 and 17, preferably have the planes of the crimped portions thereof disposed at right angles to each other. Therefore in bending the severed portion of the endless stock wire upon itself to form the parallel legs of the hairpin it is essential that the crimped portions be properly positioned with respect to the operating plunger of the bending mechanism H. This is the purpose of the electro-magnet 69, the magnetic waves of which pass through a mica plate 72 formed in the table 1 and act upon the adjacent crimped portion to dispose and hold the same horizontally, the other crimped portion being necessarily disposed vertically. The purpose of the mica plate is to provide a smooth surface for the wire to slide upon.

As an aid to the positioning magnets, I provide a guide 92 which directs the wire through the bending mechanism H from the cutting mechanism when actuated by the magnet 65. This guide 92, like the similar guide 88, is in the form of an inverted U-shaped or channeled member, and is carried by the end of one arm 93 of a bell crank, the other arm 94 of which is positioned to be engaged by the cam of a cam plate or disk 78. When the bending mechanism is inactive the guide 92 is in engagement with the table 1, it being held in this position by a spring 95. Just prior to the operation of the bending mechanism the cam of the disk 78 engages the arm 94 and elevates the guide. (See Fig. 11.)

When thus positioned by the magnets 65 and 69 and the guide 92, the severed portion of the wire is ready to be engaged by the plunger 73 of the bending mechanism, such engagement being mid-way of the crimped parts of said wire as shown in Figs. 12, 13, and 14. This plunger is slidably disposed in a horizontally positioned forming bar 74 and is normally forced outwardly thereof by an expansile spring 75. The outer movement of the plunger with respect to the bar 74 is limited by a head 76 on the inner end of the former, which head works in a slot in the latter. The actual bending of the severed portions of the wire is performed by an anvil 77 and the kerfed end of the forming bar, said kerf being of sufficient width to embrace the anvil 77 and the wire as shown in Fig. 13.

The movement of the forming bar 74 toward the anvil and the bending of the wire therearound is accomplished by the operation of the cam plate or disk 78 and an intermediately pivoted lever 79. The lever is pivoted between the ears of a bracket 80 secured to the table 1 and its upper end is engaged by the cam face of said disk 78, while its lower end contacts with one end of the forming bar, the latter in turn being slidable in parallel guides 81.

Owing to the great differences in ductility in various batches of wire and to slight variations in diameter, I preferably provide means for automatically exerting a proportionate amount of bending pressure on each severed piece of wire whereby each will be bent to the same degree. This is procured by forming the ends of the forming bar 74 on each side of the kerf in two parts and pivoting the same as at 96 so that they may move toward each other, but will be limited in their outward movement. The parts are adapted to coöperate with a pair of spaced adjustable abutments 97 which engage with the outer cam faces of each pivoted end portion. The abutments are mounted on an arcuate bracket 98 secured at its opposite ends as at 99 to the table 1 and spaced therefrom by the blocks 100.

After the bending of the hairpin is complete it is forcibly ejected from the bending mechanism by the sudden depression of the anvil and the projection of the plunger 73 outwardly. The anvil is depressed intermittently and at predetermined intervals by the movement of a lever 82 to which it is connected, such movement being performed by the engagement of a cam face 83 thereon by the end of a finger 84, which finger is carried by the forming bar 74. Both the anvil 77 and the forming bar 74 are returned to their original positions after being actuated respectively by the lever 82 and the lever 79 by contracting coiled springs 85 and 86 respectively.

The operation of the machine in the formation of a single hairpin P will now be particularly described. The eccentric 30, the cam disks 46, 51, 59 and 78 and the rotary contact elements 66 and 70 all being secured to and rotatable with the shaft 32, may be readily timed with respect to each other so that the mechanism whose operation they control may be actuated in proper order. Therefore when the wire W is fed from the straightening mechanisms, through the crimping mechanisms and to the feeding mechanism when the carriage of the latter is in the position shown in Fig. 1, said carriage and bell crank will grip the end of the wire and move toward the left end of the machine with the same until the end of its path of movement has been reached, and before the vertical crimping mechanism C is actuated by the cam disk 46.

It is only upon the completion of the movement of the carriage 14 of the feeding mechanism in this direction and while the wire is still held thereby that the vertical crimper is actuated. Immediately following the operation of the vertical crimper, the horizontal crimper comes into play, thus forming two spaced series of crimps in the wire. The carriage then moves back to the position shown in Fig. 1 to take a fresh grip on the wire, and when the wire has been gripped it is again moved toward the left, and at the proper time the cutting mechanism becomes effective to sever the crimped portion of the wire. Immediately prior to the operation of the cutting mechanism the wire is released by the feeding mechanism so that the same will not be twisted during the severing thereof.

The severed and crimped portion of the wire is then drawn by the electro-magnet 65 into proper position to be acted upon by the forming bar of the bending mechanism H, said magnet having been energized by the completion of the circuit through the rotary contact element and the fingers 67 and 67'. While the magnet 65 is still energized the magnet 69 is rendered magnetic for the purpose herein before set forth. As the forming bar 74 comes into operation and engages the wire mid-way between the crimping parts thereof, the magnets are deënergized, and when the bending is complete the finished hairpin is ejected into a suitable basket or other receptacle provided for the purpose. These operations in actual practice take place very rapidly and successively so that several hairpins may be in various stages of completion at the same time.

I claim:

1. A wire working machine including means for supplying a continuous length of wire, means for gripping and holding the wire, means located between said gripping and holding means and said supply means for crimping the wire, and a cutting mechanism located in advance of the gripping and holding means with respect to the direction of travel of the wire.

2. A wire working machine including means for supplying a continuous length of wire, means for gripping and feeding said wire, means located between said supplying means and gripping and feeding means for crimping the wire, and a cutting mechanism located in advance of the gripping and feeding means.

3. A wire working machine including means for supplying a continuous length of wire, means for gripping and holding the wire, means located between said gripping and holding means and said supply means for crimping the wire, a second means for crimping the wire located between the first crimping means and the supplying means and operative subsequent to operation of the said first crimping means, and a cutting means located in advance of the gripping and holding means.

4. A wire working machine including means for supplying a continuous length of wire, means for gripping and holding the wire, means located between said gripping and holding means and said supply means for crimping the wire, a cutting mechanism located in advance of the gripping and holding means with respect to the direction of travel of the wire, and a bending mechanism located in advance of the cutting mechanism, the wire being fed to said bending mechanism by said gripping and holding means.

5. In a wire working machine, the combination with means for supplying a wire, of means for holding one end of said wire, a pair of spaced crimping means, means for successively actuating said crimping means to grip and crimp said wire, means for simultaneously releasing said crimping means from engagement with the wire, and means for cutting off the crimped portion of the wire.

6. In a wire working machine, the combination with means for supplying a wire, of means for holding one end of said wire, a pair of spaced crimping means, means for successively actuating said crimping means to grip and crimp said wire, means for simultaneously releasing said crimping means from engagement with the wire, means for cutting off the crimped portion of the wire, and means for bending said cut off portion of the wire upon itself intermediate the crimps therein.

7. A wire working machine comprising in combination, a cutting off mechanism, means for feeding a continuous length of wire to said cutting off mechanism, a wire bending mechanism, and electro-magnetic means for attracting the severed portions of wire to feed the same from said cutting off mechanism to the bending mechanism.

8. A wire working machine comprising in combination, a cutting off mechanism, means for feeding a continuous length of wire to said cutting off mechanism, a wire bending mechanism, electro-magnetic means for feeding severed portions of wire from said cutting off mechanism to the bending mechanism, and additional electro-magnetic means for holding the severed portions of said wire in proper position to be operated upon by said bending mechanism.

9. A wire working machine comprising in combination, a cutting off mechanism, means for feeding a continuous length of wire to said cutting off mechanism, a wire bending mechanism, electro-magnetic means for feeding severed portions of wire from said cutting off mechanism to the bending mechanism, additional electro-magnetic means for holding the severed portions of said wire in proper position to be operated upon by said bending mechanism, and means for successively energizing said electro-magnetic means.

10. In a wire working machine, the combination with means for feeding a continuous length of wire, of means for forming two series of crimps in said wire at spaced points, said series being in planes at right angles to each other, means for cutting off the crimped portion of the endless wire, and means for bending the cut off portion upon itself.

11. A wire working machine comprising in combination, means for feeding a continuous length of wire, means for forming two series of crimps in said wire at spaced points, said series being in planes at right angles to each other, means for cutting off said crimped portion of the wire, a wire bending mechanism, and means for holding the planes of the series of crimps respectively parallel and at right angles to the direction of movement of the bending mechanism.

12. A wire working machine comprising in combination, means for feeding a continuous length of wire, means for forming two series of crimps in said wire at spaced points, said series being in planes at right angles to each other, means for cutting off said crimped portion of the wire, a wire bending mechanism, and electro-magnetic means for holding the planes of the series of crimps respectively parallel and at right angles to the direction of movement of the bending mechanism.

13. A wire working machine comprising in combination, means for feeding a continuous length of wire, means for forming two series of crimps in said wire at spaced points, said series being in planes at right angles to each other, means for cutting off said crimped portion of the wire, a wire bending mechanism, electro-magnetic means for attracting the end of the cut off portion of the wire to feed the same from the cutting off means to the bending mechanism, and electro-magnetic means for holding the planes of the series of crimps respectively parallel and at right angles to the direction of movement of the bending mechanism.

14. A wire working machine comprising in combination, a bending mechanism, means for supplying pieces of wire, electro-magnetic means for feeding the pieces of wire from said supply means to the bending mechanism, additional electro-magnetic means for holding the pieces of wire in proper position to be operated upon by said bending mechanism, and means for actuating the bending mechanism.

15. In a wire working machine, the combination with means for feeding a piece of wire, of means for forming two series of crimps in said wire at spaced points, said series being in planes at right angles to each other, and means for bending the crimped wire upon itself.

16. A wire supplying mechanism of the class described comprising a supporting member, a bracket carried by the member, a pair of grooved guide wheels journally mounted on the bracket, the peripheries of said wheels being in contact, a bar secured to the bracket and disposed diametrically of the wheels, and a roller carried by each end of the bar, said rollers being engaged with the peripheries of said wheels, said rollers being adapted to guide wires between the same and the adjacent wheels.

17. The herein described method of forming wire hairpins which consists in holding one end of the wire, the other end of said wire being free, successively crimping said wire in two places while being held, cutting off the crimped portion of the wire, and then bending the severed portions of the wire upon itself.

18. The herein described method of forming wire hairpins which consists in holding one end of the wire, the other end of said wire being free, successively crimping said wire in opposite directions in two places while being held, releasing said wire, cutting off the crimped portion of the wire, and then bending said severed portion of the wire upon itself midway the crimped places therein.

19. The herein described method of forming wire hairpins which consists in holding one end of a wire, the other end of said wire being free, successively crimping said wire in two places while being held, thereafter rolling said wire over a cutting blade to sever the same, and then bending said severed portion of the wire upon itself.

20. The herein described method of forming wire hairpins which consists in holding one end of the wire, the other end of said wire being free, successively crimping said wire in opposite directions in two places while being held, releasing the wire, thereafter rolling said wire over a cutting blade to sever the same, and then bending the severed portion of the wire upon itself.

21. The herein described method of forming wire hairpins which consists in holding one end of the wire, the other end of said wire being free, successively crimping said wire in opposite directions in two places while being held, releasing the wire, thereafter rolling said wire over a cutting blade to sever the same, bending said severed portion of the wire upon itself mid-way the crimped places therein, and then forcibly ejecting said crimped and bent portion of the wire.

22. A wire working machine including means for supplying a continuous length of wire, means for gripping and holding the wire, means located between said gripping and holding means and said supply means for crimping the wire, a cutting mechanism located in advance of the gripping and holding means with respect to the direction of travel of the wire, a bending mechanism located in advance of the cutting mechanism, the wire being fed to said bending mechanism by said gripping and holding means, and means for shifting the wire fed to the bending mechanism to procure exact positioning of said wire.

23. A wire working machine including means for supplying a continuous length of wire, means for gripping and holding the wire, means located between said gripping and holding means and said supply means for crimping the wire, a cutting mechanism located in advance of the gripping and holding means with respect to the direction of travel of the wire, a bending mechanism located in advance of the cutting mechanism, the wire being fed to said bending mechanism by said gripping and holding means, and a positioning magnet adjacent said bending mechanism.

24. A wire working machine including means for supplying a continuous length of wire, means for gripping and holding the wire, means located between said gripping and holding means and said supply means for crimping the wire, a cutting mechanism located in advance of the gripping and holding means with respect to the direction of travel of the wire, a bending mechanism located in advance of the cutting mechanism, the wire being fed to said bending mechanism by said gripping and holding means, and a positioning magnet adjacent the bending mechanism arranged to attract the crimped portion of the wire to determine the bending plane of said portion.

25. A wire working machine including a bending mechanism, means for feeding portions of a continuous length of wire to approximate position with respect to said bending mechanism, means for cutting off said portions for operation thereon of the bending mechanism, and a magnet adjacent the bending mechanism for procuring relatively exact position of said wire portions with respect to said bending mechanism.

In testimony that I claim the foregoing I have hereunto set my hand at Milwaukee, in the county of Milwaukee and State of Wisconsin.

HOMER P. SMITH.